United States Patent [19]

Neff

[11] Patent Number: 5,354,999
[45] Date of Patent: Oct. 11, 1994

[54] LEAK DETECTION ACHIEVED BY DETECTION OF LIGHT TRANSMITTED THROUGH AN OPAQUE LAYER INTERRUPTED BY A PASSING BUBBLE

[76] Inventor: Charles E. Neff, 406 Ripple Creek, Houston, Tex. 77024

[21] Appl. No.: 57,958

[22] Filed: Apr. 2, 1993

[51] Int. Cl.$^5$ ............................................. G01N 15/06
[52] U.S. Cl. ........................................ 250/573; 73/45.5
[58] Field of Search ............ 250/573, 574, 215, 208.2, 250/222.2, 576; 356/432, 442; 73/45.5, 45.8, 41.2

[56] References Cited

U.S. PATENT DOCUMENTS

| | | | |
|---|---|---|---|
| 2,961,869 | 11/1960 | Bagno | 73/45.5 |
| 3,590,256 | 6/1971 | Neeff | 73/45.5 |
| 4,419,883 | 12/1983 | Gelston, II | 73/45.5 |
| 4,736,621 | 4/1988 | Slinn et al. | 73/45.5 |
| 4,903,524 | 2/1990 | Kataoka et al. | 73/45.5 |
| 4,924,694 | 5/1990 | Gates | 73/45.5 |

FOREIGN PATENT DOCUMENTS

| | | | |
|---|---|---|---|
| 0110932 | 7/1982 | Japan | 73/45.5 |
| 0148338 | 7/1986 | Japan | 73/45.5 |
| 420831(A) | 1/1992 | Japan | 73/45.5 |

OTHER PUBLICATIONS

Nondestructive Testing Handbook, R. McMaster Ed., 2nd Edition, 1982, pp. 400–411.

Primary Examiner—David C. Nelms

[57] ABSTRACT

A tank filled with water is covered by a layer of oil containing carbon black. A radiation source preferably a high intensity visible spectrum light is aimed at the bottom surface of the oil/carbon layer. A radiation detector is placed parallel with and immediately above the oil/carbon layer. In operation, the oil/carbon layer will offer an opaque surface thereby preventing the passage of radiation. A bubble rising in the water will momentarily penetrate the oil/carbon layer. If the bubble diameter is greater than the oil/carbon layer thickness, the radiation will pass through the oil/carbon layer. Once the bubble bursts, the oil/carbon layer will immediately heal, thereby sealing off the passage of radiation. The radiation detector will detect any radiation passing through the oil/carbon layer. A passing bubble will be indicated as a discrete blast of radiation. The radiation detector preferably consists of an array of radiation detectors. The array produces indicia of X-Y location as a consequence of correlation of position within the array with radiation detection.

16 Claims, 3 Drawing Sheets

LEAK DETECTION ACHIEVED BY DETECTION OF LIGHT TRANSMITTED THROUGH AN OPAQUE LAYER INTERRUPTED BY A PASSING BUBBLE

BACKGROUND OF THE INVENTION

1. Field of the Invention

The present invention relates to methods and equipment for leak testing vessels and, more particularly, to techniques for detecting bubbles emanating from vessels pressurized with a gas and submerged in a liquid.

2. Description of the Related Art

A variety of techniques are known for detecting bubbles emanating from submerged vessels for the purpose of leak detection. A common technique is visual inspection. This technique is labor intensive and subject to human error and consequently is adequate and effective in low volume applications only. Another technique is to direct bubbles through a fiber optic circuit interrupting the light path. Such an interruption provides an indication of a bubble. This technique is sensitive to any contaminants that may be carried into the test liquid by the parts being tested. The leak detection equipment and method of the present invention provides an X-Y location indication of the leakage. Moreover, the utilization of high intensity radiation provides a robust process insensitive to contamination which may be introduced by the vessels being tested.

OBJECTS OF THE INVENTION

Accordingly, it is an object of this invention to provide leak detection equipment and a process which is capable of generating an X-Y indication of leakage location.

It is another object of this invention to provide leak detection equipment which is insensitive to the contaminants that may be introduced by the parts to be tested.

Other objects, advantages and features of the present invention will become apparent upon reading the following detailed description and appended claims, and upon reference to the accompanying drawings.

SUMMARY OF THE PRESENT INVENTION

In accordance with the preferred embodiment of this invention, a tank filled with water is covered by a layer of oil containing carbon black. A radiation source preferably a high intensity visible spectrum light is aimed at the bottom surface of the oil/carbon layer. A radiation detector is placed parallel with and immediately above the oil/carbon layer. In operation, the oil/carbon layer will offer an opaque surface thereby preventing the passage of radiation. A bubble rising in the water will momentarily penetrate the oil/carbon layer. If the bubble diameter is greater than the oil/carbon layer thickness, the radiation will pass through the oil/carbon layer. Once the bubble bursts, the oil/carbon layer will immediately heal, thereby sealing off the passage of radiation. The radiation detector will detect any radiation passing through the oil/carbon layer. A passing bubble will be indicated as a discrete blast of radiation. The radiation detector preferably consists of an array of radiation detectors. The array produces indicia of X-Y location as a consequence of correlation of position within the array with radiation detection.

In operation, vessels to be tested are pressurized with air and then submerged below the oil/carbon layer. If leaks are present, they will appear instantaneously. The bubbles will rise vertically in the water until they break the oil/carbon layer. Once the radiation has passed through the oil/carbon layer, it strikes the radiation detection array. The passage of radiation provides an indication of the presence of bubbles and consequently a leaking vessel.

The presence of bubbles may be sufficient in and of itself to provide a go, no-go test. If a completely continuous vessel wall is not essential, some defects may be acceptable. In such an instance, the magnitude of the defect may be discerned by determining the rate at which air is escaping from the vessel. The rate at which bubbles are escaping may be used to identify a defective vessel if the bubbles emanating from the test vessel fall within a close range of sizes such that an approximation of the volume of air escaping may be made. That is, for example, if more than a threshold unit of bubbles per second is detected, a defective vessel determination can be provided.

Further, the X-Y location of the radiation incident on the radiation detection array provides an indication of the location of the defect to help focus repair activities or pinpoint manufacturing process deficiencies. The tank containing water may have a surface which is segmented into portions. For example, an oil-boom like section may be used to contain the oil/carbon layer in a discrete portion of the surface, preferably beneath the radiation detection array. This opens up the remaining portion of the surface for use as an entry and exit avenue for vessels to be tested. This technique is essential to prevent contamination of the vessels to be tested and also provides a maintenance free, undisturbed oil/carbon layer. In the alternative, an inverted funnel may be submerged in the tank and used to collect the rising bubbles. After the rising bubbles have been collected, they may be ducted to the surface of the water in a conduit. The oil/carbon layer may be located in the conduit on the surface of the water. In fact, the oil/carbon layer may be isolated from the first tank by locating the conduit in a separate tank which interchanges water with the first tank. In operation, vessels to be tested would be passed under the inverted funnel for testing.

These and other aspects of the present invention will become more readily apparent by reference to the following detailed description of the embodiments as shown in the drawings.

BRIEF DESCRIPTION OF THE DRAWINGS

For a more complete understanding of this invention, one should refer to the embodiments illustrated in greater detail in the accompanying drawings and described below by way of examples of the invention. In the drawings.

DETAILED DESCRIPTION OF THE PREFERRED EMBODIMENT

Figure 1:
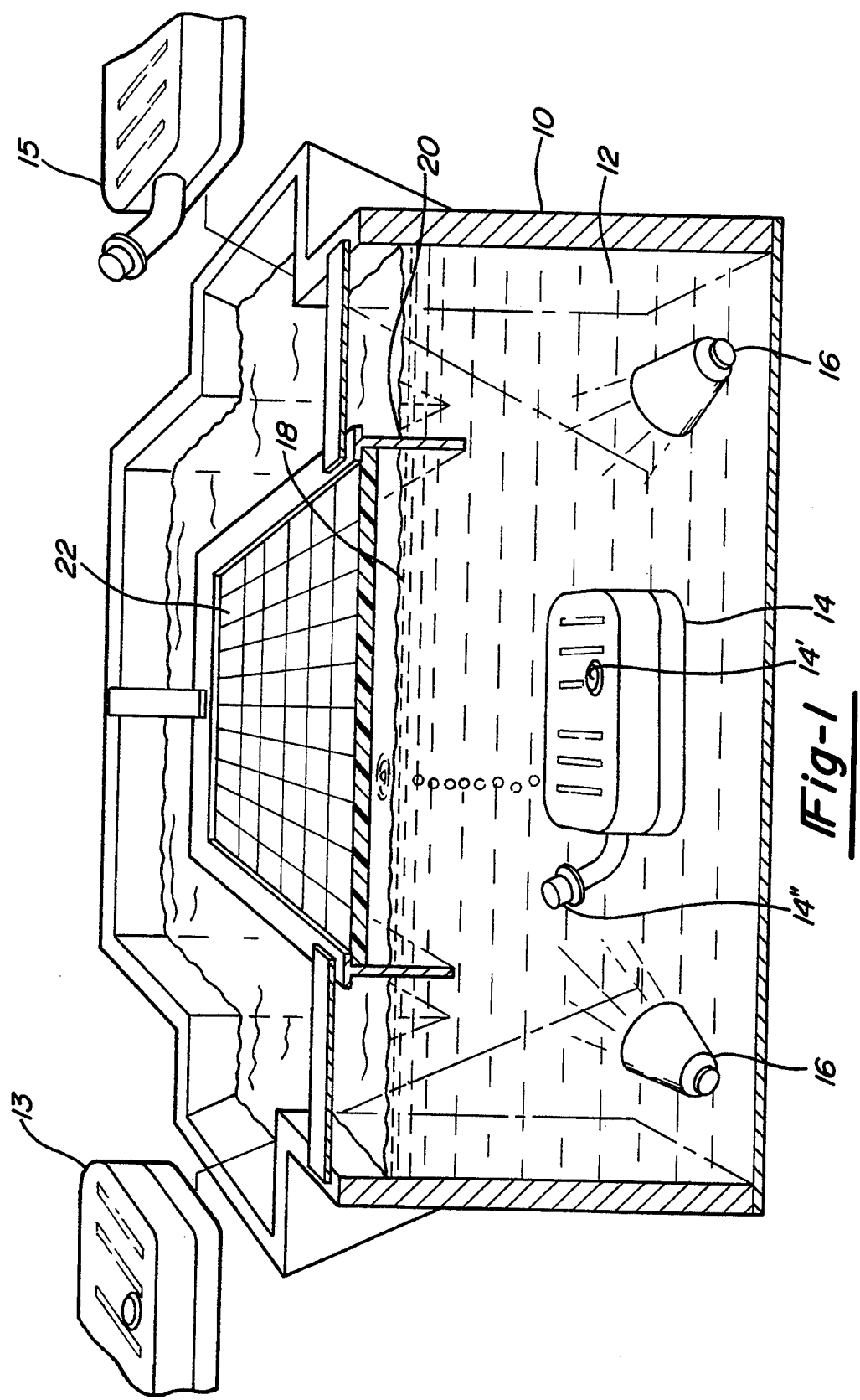
FIG. 1 is a side elevation view of the equipment for use in leak detection of vessels.

FIG. 1 is an illustration of the present invention consisting of a tank 10 containing a liquid 12 preferably water. A vessel 14 (to be tested) is shown submerged in the water 12. Radiation is provided by lights 16. The lights 16 are aimed at a layer 18 of oil contaminated with carbon. The oil/carbon layer 18 is contained by a baffle 20. Radiation detection array 22 comprised of individual photodetectors (not shown in FIG. 1) is located immediately above said oil/carbon layer 18.

Figure 2:
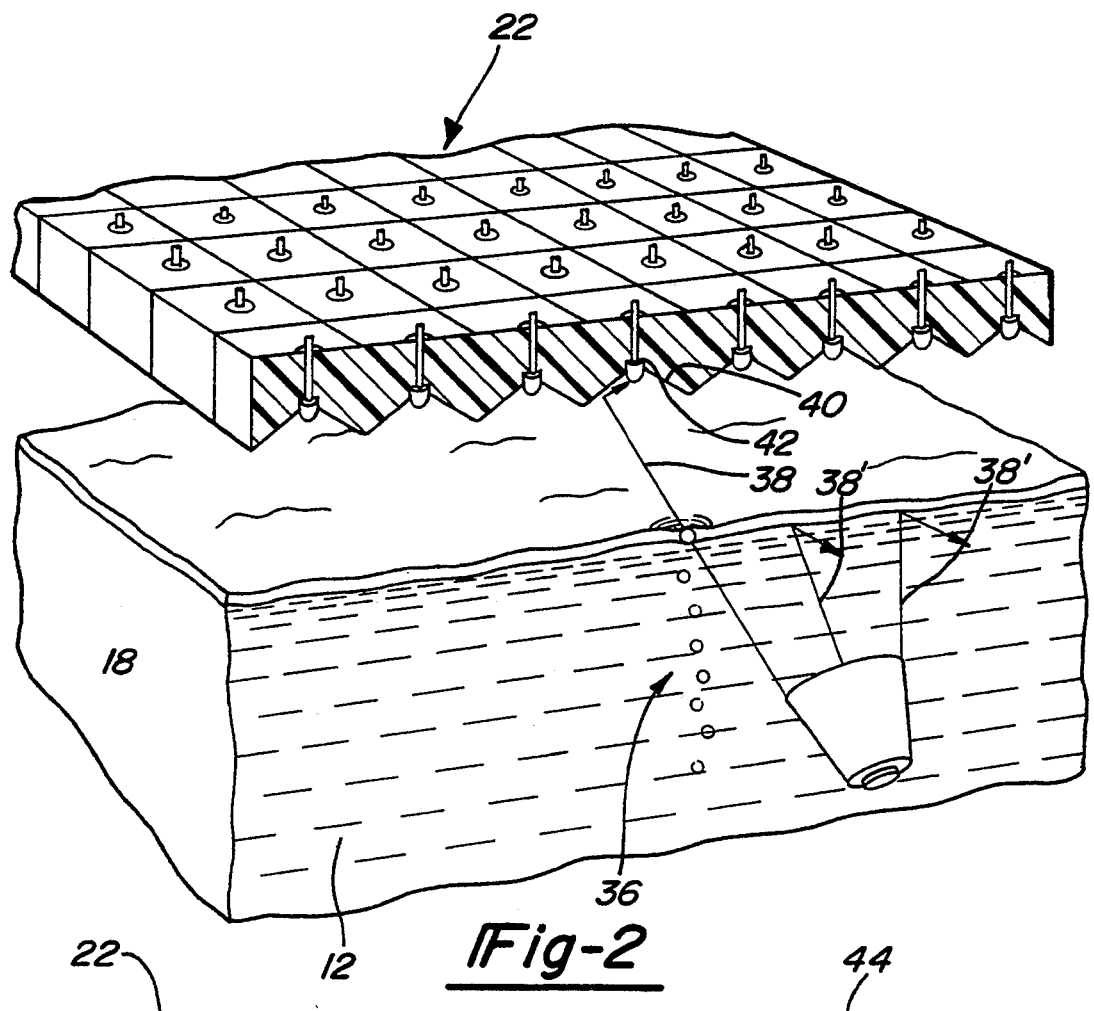
FIG. 2 is an enlarged fragmentary view of the bubble detection process.

FIG. 2 is a view of a series of bubbles 36 rising in the water 12. One of the bubbles is shown in the oil/carbon layer 18 creating a path for radiation 38 to pass and strike reflector 22 diverting radiation 38 to photo resistor 42. The remainder of the radiation 38' is shown reflecting inconsequentially back into the water 12. Consequently photoresistor 42 of array 22 will produce indicia of a bubble at that specific location.

Figure 3A:
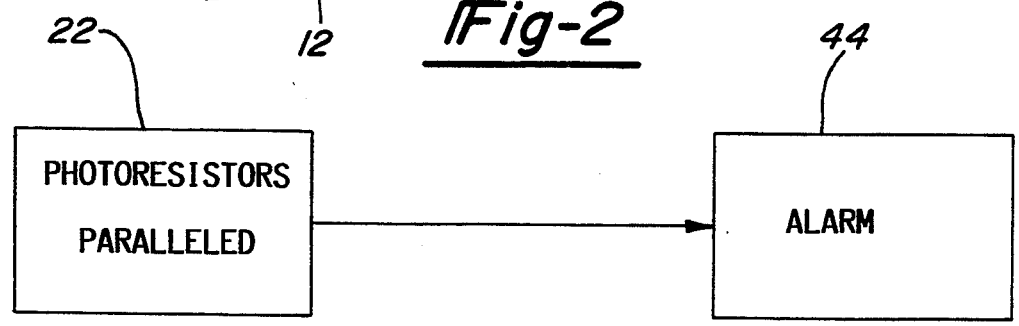
FIG. 3A is a flow diagram of the circuit used to provide go, no-go indicia.
Figure 3B:
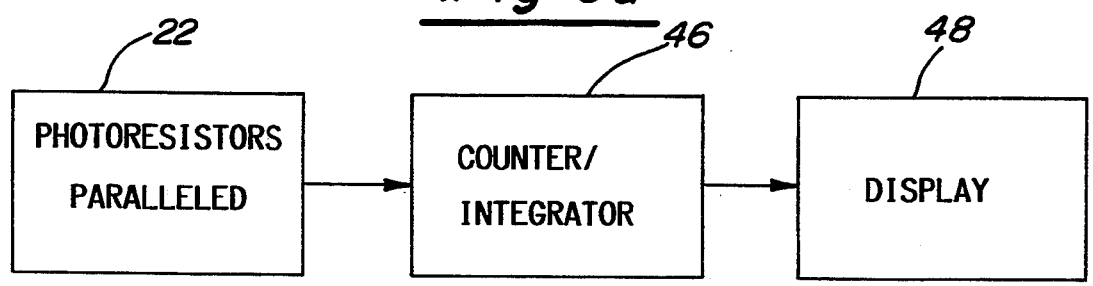
FIG. 3B is a flow diagram of the circuit used to provide a rate of leakage indication.
Figure 3C:
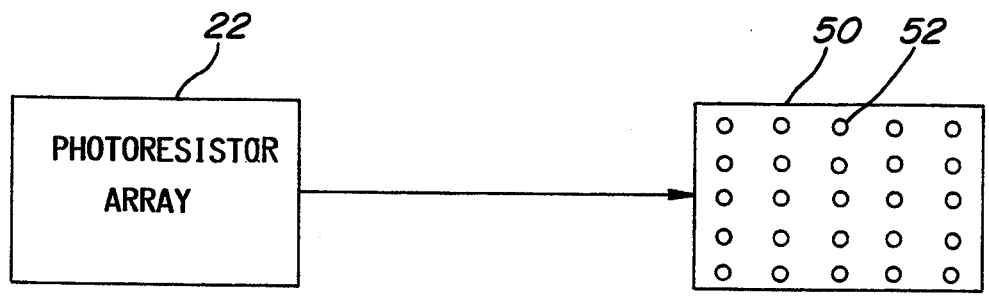
FIG. 3C is a flow diagram of the circuit used to provide an X-Y location indication of leakage.

The plurality of photoresistors 42 of the array may be connected in parallel as shown in FIG. 3A to provide a go, no-go alarm 44 upon any one photoresistor receiving radiation. As shown in FIG. 3B, the go, non-go test may be enhanced by using an array of paralleled photoresistors with a counter 46 to produce a display 48 of the rate at which the bubbles are emanating from the vessel being tested. As shown in FIG. 3C, the photoresistors may be individually hardwired to a display 50 of LED's 52 which mimic the physical position of the photoresistors and provide a display of the X-Y location of the defects.

Figure 4:
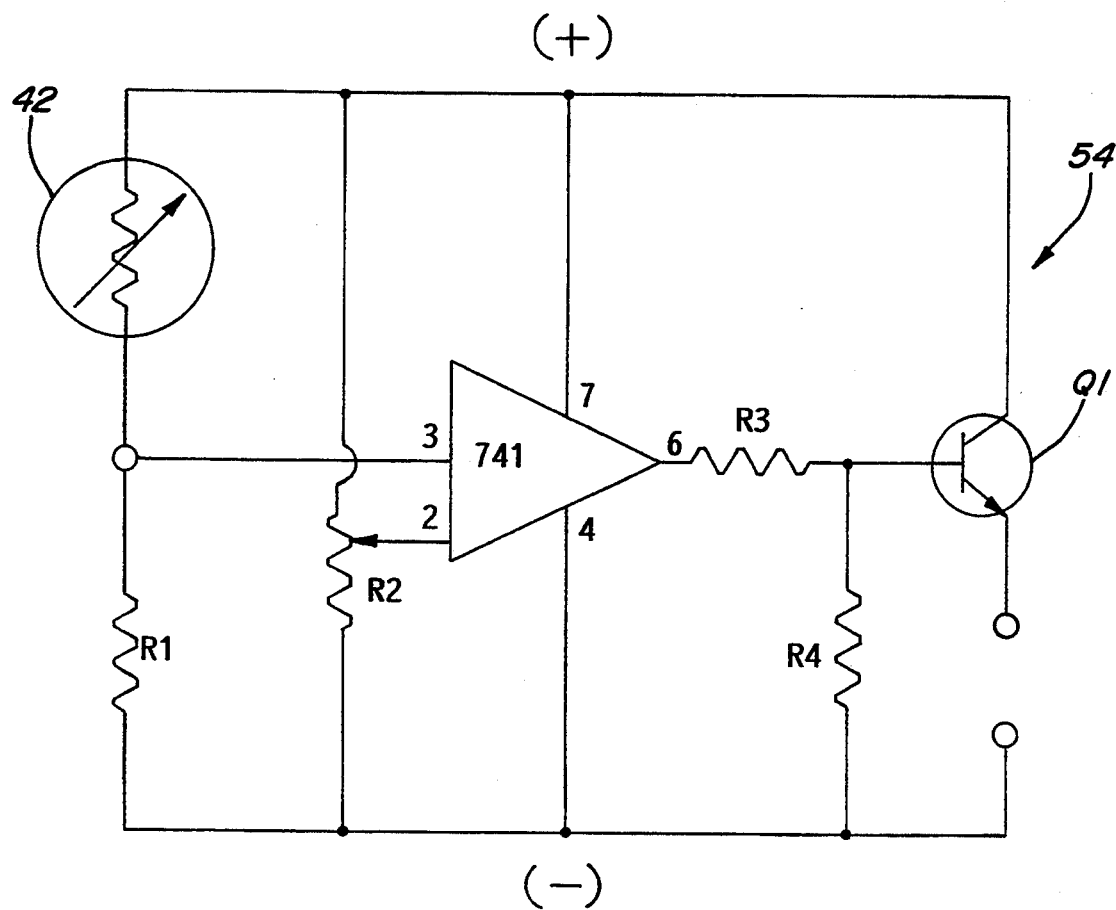
FIG. 4 is a circuit diagram for use in producing an output signal from a photoresistor.

FIG. 4 provides a basic electrical circuit which may be used in conjunction with the photoresistors to provide output indicia of radiation detection. The circuit 54 comprises a photoresistor 42 having a first end connected to a power supply and a second end connected to pin 3 of a 741 op amp. Pin 3 of the 741 op amp is connected to the negative pole of the power supply through resistor R1. Center-take-off of potentiometer R2 is connected to pin 2 of the 741 op amp. Opposing ends of R2 are connected to the positive pole of the power supply and then to the negative. Pin 7 of the 741 op amp is connected to the positive pole of the power supply and pin 4 of the 741 op amp is connected to the negative pole. Pin 6 of the 741 op amp is connected to the base of transistor Q1 through resistor R3. The base of transistor Q1 is connected to the negative side of the power supply through resistor R4. The collector of transistor Q1 is connected to the positive pole of the power supply and the circuit output is provided between transistor Q1 and the negative pole of the power supply. A piezo buzzer or LED (not shown) may be connected between the emitter and ground to provide an indication that the respective photoresistor has received radiation.

The embodiments herein described teach usage of a photoresistor in conjunction with reflectors to detect radiation passage through a less than continuous oil/carbon layer. It is clearly within the scope of the present invention to use other photo optic techniques including using a camera to provide a more precise delineation of X-Y location of the discontinuity. It is further thought that the apparatus and method of the present invention and many other intended advantages will be understood from the foregoing description and it will be apparent that various changes will be made in form, construction and arrangement of parts thereof without departing from the spirit and scope of the invention or sacrificing all of its material advantages the form herein before being described being merely a preferred or exemplary embodiment.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. An apparatus for detecting bubbles in a first liquid comprising:
   a second liquid having a lower specific gravity than said first liquid and forming a continuous layer on the surface of said first liquid;
   a radiation source disposed on a first side of said second liquid;
   a radiation detecting means located on a second side of said second liquid;
   said second liquid initially offering an opaque barrier between said radiation emitting source and said radiation detecting means; and
   means providing indicia of a discontinuity in said second liquid layer caused by a bubble which interrupts the continuity of said second layer thereby permitting radiation to pass therethrough to said radiation detecting means.

2. The apparatus for detecting bubbles of claim 1 wherein said second liquid is an oil containing carbon black.

3. The apparatus for detecting bubbles of claim 1 wherein said radiation emitting source is visible spectrum light and said detecting means is a visible spectrum light sensitive means.

4. The apparatus for detecting bubbles of claim 1 wherein said indicia of discontinuity is an alerting means.

5. The apparatus for detecting bubbles of claim 1 further including means to determine the rate at which said discontinuities occur.

6. The apparatus for detecting bubbles of claim 1 further including means to determine an X-Y location for said discontinuity and providing indicia of location on said vessel.

7. An apparatus for leak testing vessels comprising:
   means for pressurizing said vessel with a gas;
   means for submerging said vessel in a first liquid;
   a second liquid having a lower specific gravity than said first liquid and forming a continuous layer on the surface of said first liquid;
   a radiation source located on a first side of said second liquid;
   a radiation source detecting means located on a second side of said second liquid;
   said second liquid providing an initially opaque barrier between said radiation source and said radiation detecting means; and
   means providing indicia of a discontinuity in said second liquid caused by a bubble emanating from a defect in said vessel which has risen to the surface and interrupted said continuous second layer thereby permitting radiation to pass therethrough to said radiation detecting means.

8. The apparatus for detecting bubbles of claim 7 wherein said second liquid is an oil containing carbon black.

9. The apparatus for detecting bubbles of claim 7 wherein said radiation emitting source is visible spectrum light and said detecting means is a photoresistor.

10. The apparatus for detecting bubbles of claim 7 wherein said indicia of discontinuity is a piezo alarm.

11. The apparatus for detecting bubbles of claim 7 further including means to calculate and store the rate at which said discontinuities occur.

12. The apparatus for detecting bubbles of claim 7 further including means to determine an X-Y orientation for said discontinuity.

13. The apparatus for detecting bubbles of claim 7 further including means defining a baffle defining a boundary for containing said second liquid within a discrete region of said surface of said first liquid.

14. An apparatus for leak testing vessels comprising:
means for pressurizing said vessel with a gas;
means for submerging said vessel in a first liquid;
a second liquid having a lower specific gravity than said first liquid and forming a layer on the surface of said first liquid;
said second liquid having a baffle means containing said second liquid within a discrete region of said surface of said first liquid; and
a visible spectrum light source located below said second liquid layer and means detecting discontinuities in said second liquid layer.

15. A process for detecting a defect in the continuity of the wall of a vessel accomplished by the steps:
pressurizing said vessel with a gas;
submerging said vessel in a first liquid;
disposing a second liquid having a lower specific gravity than said first liquid on the surface of said first liquid and containing said second liquid in a discrete region of the surface of said first liquid;
applying radiation to a first side of said second liquid; and
detecting radiation transmitted to a second side of said second liquid through discontinuities formed in said second liquid by a bubble emanating from a defect in said vessel which has risen to the surface and interrupted said continuous second layer.

16. The process described in claim 15 wherein said discontinuity may be associated with an X-Y location which may be associated with a location on said vessel.

* * * * *